United States Patent [19]

Bjoerk et al.

[11] Patent Number: 5,018,183

[45] Date of Patent: May 21, 1991

[54] X-RAY FILM MAGAZINE

[75] Inventors: Erik Bjoerk, Stockholm; Ola Wiklund, Jaerfaella, both of Sweden

[73] Assignee: Siemens Aktiengesellschaft, Munich, Fed. Rep. of Germany

[21] Appl. No.: 534,553

[22] Filed: Jun. 7, 1990

[30] Foreign Application Priority Data

Jun. 12, 1989 [EP] European Pat. Off. ........ 89110600.7

[51] Int. Cl.⁵ .................... G03B 42/02; G03B 42/04
[52] U.S. Cl. ................................ 378/173; 378/172; 378/174; 378/188; 378/182; 378/184
[58] Field of Search ............... 378/169, 170, 171, 173, 378/182, 184, 187, 174, 188

[56] References Cited

U.S. PATENT DOCUMENTS 4,355,798 10/1982 Villa ........................... 271/21
4,447,053 5/1984 Wager et al. ................. 271/113
4,948,113 8/1990 Lippold et al. ............... 378/173

Primary Examiner—Edward P. Westin
Assistant Examiner—Don Wong
Attorney, Agent, or Firm—Hill, Van Santen, Steadman & Simpson

[57] ABSTRACT

An x-ray film magazine has a housing and a cover which in combination form an interior volume having an approximately C-shaped cross section, which receives a number of sheets of x-ray film in a stack made to conform to the C-shaped cross section. A foil is provided in the interior of the magazine having one end rigidly connected to a base of the housing, and an opposite end being resiliently connected to the cover of the magazine. The foil at least partially supports a bottom-most or lowest sheet of the stack of x-ray film sheets, and due to the resilient mounting of the foil, always presents the uppermost sheet in the stack of film sheets to be presented in a position which permits the uppermost sheet to be reliably conveyed out of the magazine to an exposure position in an exposure component adjacent the film magazine.

3 Claims, 4 Drawing Sheets

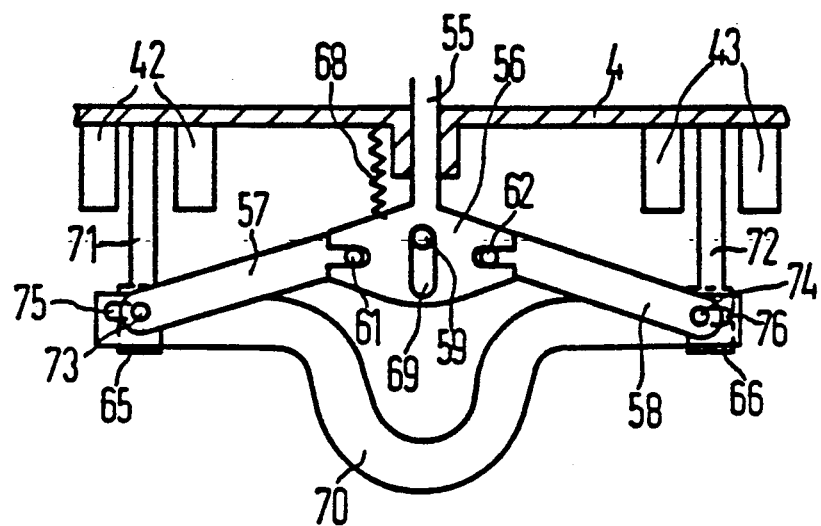
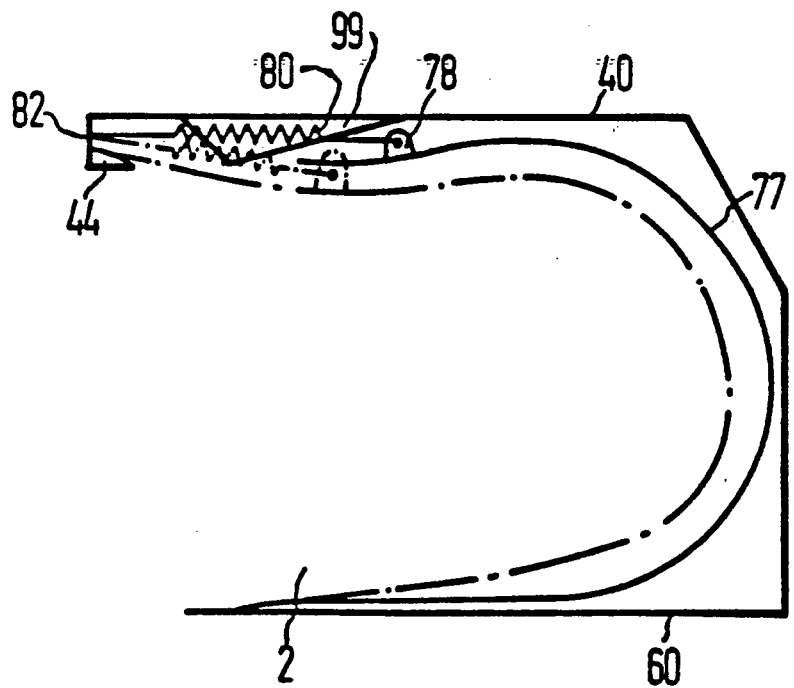

X-RAY FILM MAGAZINE

BACKGROUND OF THE INVENTION

1. Field of the Invention

The present invention is directed to an x-ray film magazine for holding a plurality of sheets of x-ray film for conveyance into an exposure unit disposed adjacent the film magazine.

2. Description of the Prior Art

An x-ray film magazine wherein a plurality of sheets of x-ray film are held in an approximately C-shaped cross section of a magazine housing, is described in French Patent 2,499,530, corresponding to U.S. Pat. No. 4,447,053. A screw for separating the sheets of film is attached in the housing, substantially centrally in the C-shaped cross section. When conveying a sheet of film out of the magazine, the screw is rotated so that the sheets of film assume a shorter path from flight to flight of the screw, so that the sheet of film which assumes the shortest path projects from an opening of the housing. The projecting portion of this sheet of film is subsequently grasped by a conveyor means which forwards the sheet of film to an exposure position in an adjacent exposure unit.

SUMMARY OF THE INVENTION

It is an object of the present invention to provide an x-ray film magazine of the type having a housing with a substantially C-shaped cross section which holds a plurality of sheets of film such that an uppermost sheet of film in the stack assumes a shape or position which insures, in a simple and inexpensive manner, that this uppermost sheet of film will be reliably forwarded to an adjacent exposure unit.

It is a further object of the present invention to provide such an x-ray film magazine wherein loading of the magazine can be undertaken simply and quickly.

These and other objects are achieved in an x-ray film magazine of the type described in U.S. Pat. No. 4,447,053, having a foil with the improvement of a first end rigidly connected to a base of the magazine housing, and an opposite end resiliently connected to a cover of the magazine such that, given a loaded film magazine, the foil at least partially supports a lowest x-ray film sheet in a stack in a prescribable way. The resilient attachment of the foil to the cover provides an inexpensive and simple support for the loaded sheets of film, which insures that an uppermost sheet of film in the stack of film will always be presented in a position such that this uppermost sheet can be forwarded to an exposure unit. Moreover, the structure employing the resiliently mounted foil permits packet or bulk loading to be undertaken, i.e., a stack of sheets of film can be placed into the film magazine, without the necessity of sheet-by-sheet loading.

In a further embodiment of the invention, the end of the foil which is resiliently connected to the cover of the magazine is guided so that it is inwardly displaced as the number of sheets of x-ray film in the stack is reduced, as sheets of film are convened out of the magazine. This further insures that the uppermost sheet of film, regardless of the number of sheets of film remaining in the stack, is always located in the position from which it can be forwarded to the exposure unit.

In another embodiment of the invention, at least one wedge-shaped element is connected to the interior of the cover as a guide. This insures that the foil exactly follows the last sheet of film and appropriately shapes it when the number of sheets of film remaining in the magazine is decreased.

DESCRIPTION OF THE DRAWINGS

FIGS. 5 and 6 are plan views of the removal means shown in FIG. 4.

FIG. 7 is a side view of a cover for the x-ray film magazine of FIGS. 1, 2 and 4.

DESCRIPTION OF THE PREFERRED EMBODIMENTS

Figure 1:
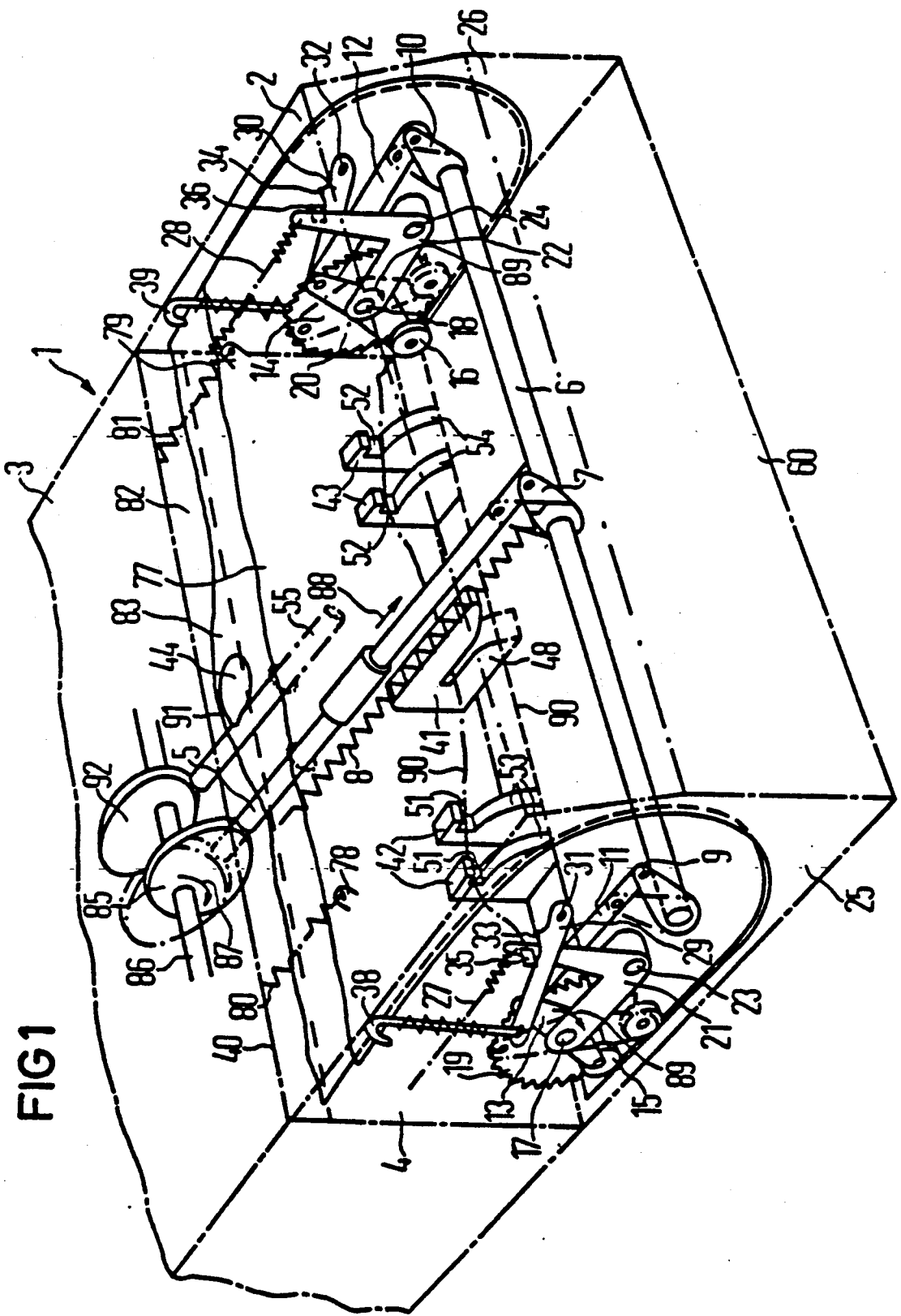
FIG. 1 is a perspective view of an x-ray film magazine constructed in accordance with the principles of the present invention.

An x-ray film changer 1 is shown in FIG. 1 which includes an x-ray film magazine 2 connected to an exposure unit 3. The x-ray film magazine 2 is shaped so that sheets of x-ray film are seated therein in a C-shaped arc. The x-ray film magazine 2 includes a separating, or single-feed, mechanism which includes a rod 5 projecting through a wall 4 between the x-ray film magazine 2 and the exposure unit 3. One end of the rod 5 is connected to a shaft 6 via a connecting arm 7. The rod 5 is attached to the connecting arm 7 via an articulated connection, and the shaft 6 is rigidly attached to the connecting arm 7. The shaft 6 is disposed transversely relative to the longitudinal direction of the rod 5. A tension spring 8 is connected between the connecting arm 7 and the wall 4. At each of its ends, the shaft 6 is attached to respective connecting arms 9 and 10. The connecting arm 9 is connected to a roller 15 via a linkage consisting of a rod 11 and a lever arm 13. The connecting arm 10 is connected to a similar roller 16 via a similar linkage consisting of a rod 11 and a lever arm 14. The lever arms 13 and 14 are seated so as to be pivotable around respective axes 17 and 18. A gear wheel 19 is mounted so as also to be rotatable around the axis 17 and a similar gear wheel 19 is mounted so as to be rotatable around the axis 18. The lever arms 13 and 14 are dimensioned such that the distance from the axes 17 and 18 to the respective ends of the rollers 15 and 16 is in each case greater than the radius of the gear wheels 19 and 20. The rollers 15 and 16 thus project slightly beyond the circumference of the gear wheels 19 and 20, so that the rollers 15 and 16 respectively lift the gear wheels 19 and 20 off of a seating surface, such as the base of the film magazine 2, given a defined position of the respective lever arms 13 and 14.

The axes 17 and 18 of the gear wheels 19 and 20 also intersect respective ends of angular levers 21 and 22. The levers 21 and 22 are mounted so as to be pivotable around further axes 23 and 24, secured to the respective side walls 25 and 26 of the magazine 2. The respective free ends of each levers 21 and 22 are connected via respective tension springs 27 and 28 to the wall of the magazine 2.

The x-ray film magazine 2 also contains a separating, or single-feed, element 41 for the x-ray film sheets and two slide blocks 42 and 43 arranged in close proximity at each side of the separating element 41. The operation of the separating element 41 and the slide blocks 42 and 43 shall be set forth in detail below.

Figure 2:
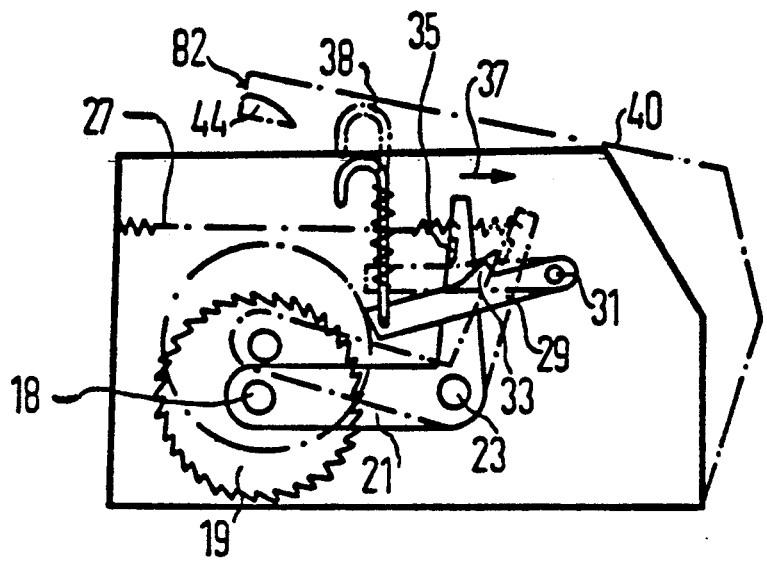
FIG. 2 is a side view of the x-ray film magazine shown in FIG. 1.

As can be seen in FIG. 2, the gear wheels 19 and 20 can be pivoted in upward direction around the respective axes 23 and 24 by rotation of respective levers 21 and 22. The levers 21 and 22 can be locked in the upward positions (shown in broken lines) by respective locking plates 29 and 30. The locking plates 29 and 30 are mounted so as to be rotatable around respective shafts 31 and 32 having respective detents 33 and 34 into which a respective projecting plate 35 or 36, allocated to the levers 21 and 22, engages when the spring-loaded lever 21 or 22 is pulled in the direction of the arrow 37. Respective spring-loaded pins 38 and 39 are situated at the free ends of each locking plate 29 and 30. The pins 38 and 39 project beyond the walls 25 and 26 of the film magazine 2 when the locking plates 29 and 30 are situated in the locking position (shown in broken lines) for the levers 21 and 22.

FIG. 2 also shows a cover 40 for the x-ray film magazine 2 in an open position. When the cover 40 is closed, the spring-loaded pins 38 and 39 are pressed downwardly. Simultaneously, the locking plates 29 and 30 are pivoted around their respective axes 31 and 32 that the detents 33 and 34 disengage from the plates 35 and 36 of the levers 21 and 22. This causes the respective gear wheels 19 and 20 to spring back into their original positions.

The cover 40 also has a retaining wedge 44. When the cover 40 is closed, the retaining wedge 44 projects into the interior of the film magazine 2. FIG. 2 shows only the pivoting of the gear wheels 19 and 20 and the angular levels 21 and 22, and the locking positions thereof, with other components omitted for clarity.

Figure 3:
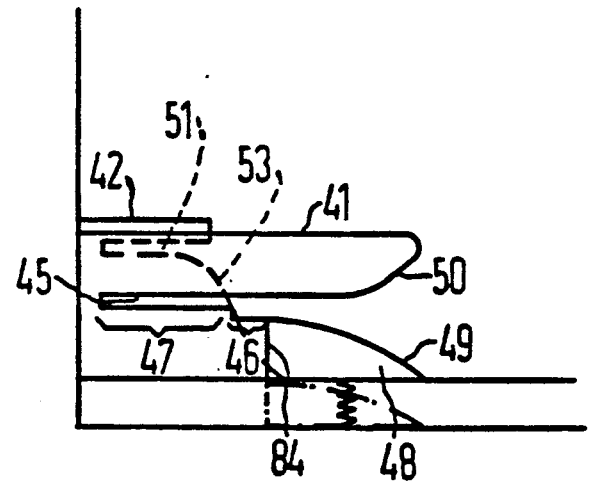
FIG. 3 is a side view of a separating stage of the x-ray film magazine of FIGS. 1 and 2.

As can be seen in FIG. 3, the separating element 41 has a gap 45 with a depth which is subdivided into two differently shaped paths 46 and 47. Along the path 46, the gap 45 has a clearance height which is slightly larger than the thickness of two sheets of x-ray film. The clearance height of the gap 45 along the path 47 corresponds to the thickness of a single sheet of x-ray film.

A wedge-shaped glide piece 48, which can be resiliently pressed downwardly to the bottom plate 60, is provided as an extension of the gap 45. The glide piece 48 has a gliding surface 49 for the sheets of x-ray film. A further gliding surface 50 for the sheets of x-ray film is disposed opposite the gliding surface 49. One of the glide blocks 42 and 43, for example block 43, is also shown in the FIG. 3. Each glide blocks 42 and 43 has a gap 51 or 52 therein. The gaps 51 and 52 are disposed higher, in relationship to the gap 45 of the separating element 41, as measured from the bottom plate 60 of the x-ray film magazine 2. The glide blocks 42 and 43 have respective gliding surfaces 53 and 54 for the sheets of x-ray film.

Figure 4:
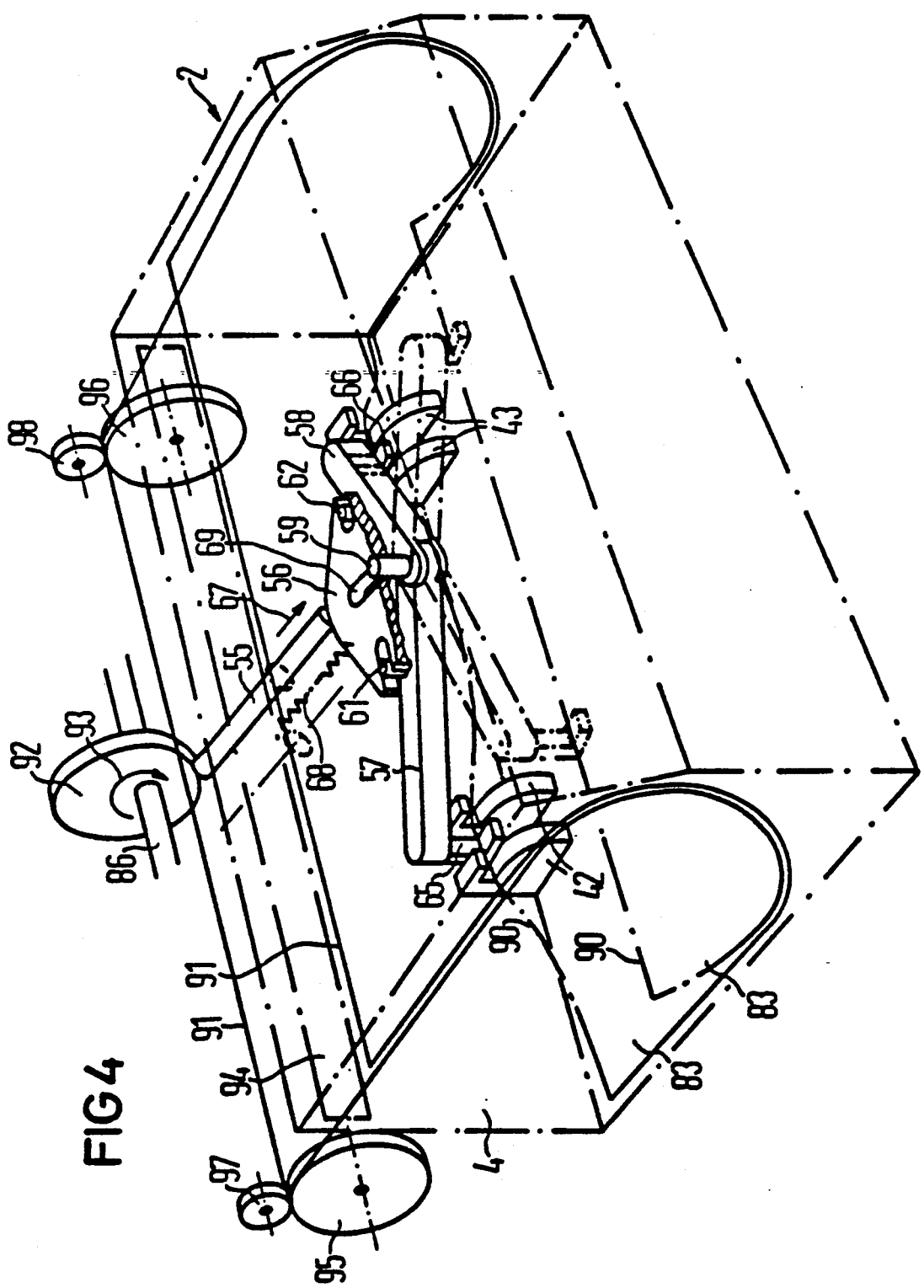
FIG. 4 is a prospective view of the x-ray film magazine of FIGS. 1 and 2 showing a removal means for sheets of film.

A removal mechanism for sheets of x-ray film, which operates in interaction with the separating or single-feed mechanism for the sheets of x-ray film shown in FIG. 1, is shown in FIG. 4. Both the removal mechanism and the separating mechanism are arranged in the same x-ray film magazine, however for clarity the mechanisms have been shown and are described separately from each other.

The removal mechanism includes a rod 55 having a slide 56 disposed at one end for two swivel arms 57 and 58. In order to illustrate the structure of the swivel arm 57 and 58, the slide 56 is shown partly broken away.

The swivel arms 57 and 58 are seated so as to be rotatable around a shaft 59, which is stationary and is disposed perpendicular to the bottom plate 60. Each swivel arm 57 and 58 has an upwardly projecting trunnion 61 or 62 which is received in a respective recess 63 or 64 of the slide 56. The respective free ends of the swivel arm 57 and 58 have hooks 65 and 66 thereon. In one position of the swivel arms 57 and 58, which may be referred to as the standby position, the hook 65 is between the glide blocks 42, and hook the 66 is between the glide blocks 43. The height of the hooks 65 and 66, as measured from the bottom plate 60, corresponds to the height of the gaps 51 and 52 in the glide blocks 42 and 43. When the slide 56 is displaced in the direction of the arrow 67, the swivel arms 57 and 58 are moved into the position shown with broken lines by displacement of the trunnions 61 and 62.

A tension spring 68 is secured to the slide 56 and to the wall 4 of the x-ray film magazine 2. The tension spring 68 causes the slide 56, together with the swivel arms 57 and 58, to be urged to their original position. A groove 69 permits the slide 56 to be moved forward and backward, despite the rigid shaft 59.

Figure 5:
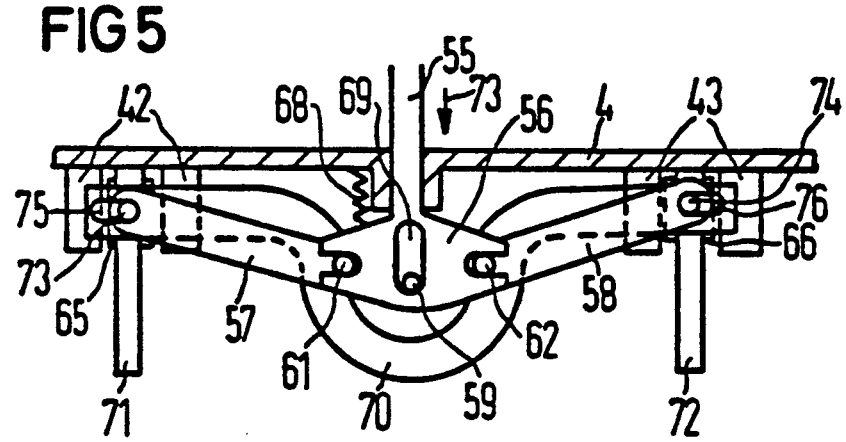

The standby position of the removal mechanism is shown in FIG. 5. In order for the swivel arms 57 and 58, and thus the hooks 65 and 66, to be displaced parallel and linearly, the swivel arms are connected to an "omega-shaped" (i.e. an "Ω-shaped") element 70, having opposite ends displaceably attached to respective tubular rails 71 and 72. The swivel arms 57 and 58 are connected to the element 70 via respective trunnions 73 and 74 which engage respective channels 75 and 76 of the elements 70. When the rod 55 and thus the slide 56 are displaced in the direction of the arrow 67, the swivel arms 57 and 58 together with the element 70 are displaced along the rails 71 and 72 until they assume the position shown in FIG. 6.

As shown in FIG. 7, a foil 77, having a size roughly corresponding to a sheet of x-ray film, is provided in the magazine 2. The foil 77, which has a C-shaped arc, is rigidly secured at one end to the bottom plate 60, and is resiliently attached at an opposite end 82, to the free end of the cover 40. The resilient attachment is achieved by mounts 78 and 79 connected to respective tension springs 80 and 81.

The foil 77 compensates for the different bending radii of the sheets of x-ray film which are retained in a C-shaped configuration. The foil 77 performs this function for an entire stack of sheets of film down to one sheet of film, as sheets of film are removed. The foil 77 always supports the bottom sheet of film. The outer solid line in FIG. 7 shows the position of the foil 77 when the x-ray film magazine 2 is fully loaded with sheets of film. The tension springs 80 and 81 are extended. When, as a result of a series of exposures, the stack of x-ray film becomes progressively thinner, the tension springs 80 and 81 compress, so that the bottom sheet of film of the stack is always supported by the foil 77. Two wedge-shaped elements 99 and 100, which are connected at each side of the retaining wedge 44 and to the cover 40, serve as guide for the mounts 78 and 79 of the foil 77. The broken-line illustration shows the position of the foil 77 and the position of the tension springs 80 and 81 when a single sheet of x-ray film remains in the magazine 2.

Before the x-ray film magazine 2 is loaded with a stack of sheets of x-ray film (only one sheet of film 83 being shown in the drawings) the gear wheels 19 and 20 are first pivoted to the upper position as shown in FIG. 2, and are locked in this position. The film stack is first guided between the bottom plate 60 and the gear wheels 19 and 20 to the separating element 41. The front edge of the film stack is subsequently pushed between the gliding surfaces 49 and 50 such that the glide piece 48 is pressed downwardly, as shown in FIG. 3. The front edge of the film stack now reaches an end plate 84. The film stack is placed into the foil 77 and that edge 91 of the sheet 83 of film lying opposite the front edge 90 is pushed between the retaining wedge 44 and the cover 40. The cover 40 is then closed, causing the pins 38 and 39 to be pressed downwardly, so that the gear wheels 19 and 20 disengage from their upper positions and are placed against the surface of the uppermost sheet 83 of the film in the film stack, as shown in FIG. 2. Because the gear wheels 19 and 20 are spring loaded by the tension springs 27 and 28, a force in the direction of the stack of film is exerted on them.

The separating mechanism is controlled by an eccentric disk 85 arranged in the exposure unit 3, via a system of articulated linkages 6, 7 and 9 through 14, similar to a parallelogram linkage, as shown in FIG. 1. Such control ensues by the eccentric disk 85 displacing the rod 5 along its longitudinal direction. In the position of the eccentric disk 85 shown with broken lines in FIG. 1, the rod 5, via the connecting arm 7, operates the shaft 6, the further connecting arm 9 and 10, the rods 11 and 12, the lever arms 13 and 14, and the rollers 15 and 16 such that they do not contact the surface of the sheet 83 of film. The position, also shown with broken lines, of these rollers shows that such contact does not occur. When the eccentric disk 85 is rotated around the axis 86 thereof in the direction of the arrow 87, the rod 5 is displaced in the direction of the arrow 88, and operates on the system of articulations 6, 7, 9–14, such that the rollers 15 and 16 are pivoted around the respective shafts 17 and 18 in the direction of the arrows 89. Simultaneously, the gear wheels 19 and 20 are rotated in the same direction by the swiveling of the rollers 15 and 16.

The gear wheels 19 and 20 grasp the uppermost sheet 83 of the film, which is thus conveyed into the gap 45 of the separating element 41. The possibility of simultaneously, inadvertently conveying a sheet of film in the film stack which is immediately below the sheet 83 is prevented at the end of the path 46 of the gap 45, as shown in FIG. 3. The gear wheels 19 and 20 are rotated around the respective axes 17 and 18 until the sheet of film 83 has reached the end of the path 47 of the gap 45. The sheet of film 83, which has now been separated from the film stack, simultaneously slides onto the gliding surfaces 53 and 54 of the glide blocks 42 and 43, and into the gaps 51 and 52. Because the gaps 51 and 52 of the glide blocks 42 and 43 are disposed higher than the gap 45 of the separating element 41, the edge 90 of the sheet of film 83 is given a wave shape, shown with broken lines in FIG. 1.

Due to the conveying of the sheet of film 83 in the described direction, the edge 91 thereof disengages from the grasp of the retaining wedge 44. In this latter position of the gear wheels 19 and 20, the rollers 15 and 16, have reached the position shown in FIG. 1 in which they lift the gear wheels 19 and 20 slightly off of their seating surfaces.

The removal mechanism shown in FIG. 4 is driven by a further eccentric disk 92, attached to the same axis 86 as the eccentric disk 85. In the standby position of the removal mechanism shown in this FIG. 4, the hooks 65 and 66 of the swivel arms 57 and 58 embrace the edge 90 of the sheet of film 83. By rotation of the eccentric disk 92 around the axis 83 in the direction of the arrow 93, the rod 55, and thus the slide 56, are displaced in the direction of the arrow 67. Via the trunnions 61 and 62, the slide 56 actuates the swivel arms 57 and 58, and simultaneously the hooks 65 and 66, so that the sheet of film 83 is conveyed to the position shown with broken lines.

The rollers 15 and 16, which rest on the surface of the sheet of film 83, roll during the film transport. The sheet of film 83 is first conveyed through a slot 94 provided in the wall 4 of the x-ray film magazine 2, and reaches a conveyor mechanism provided in the exposure unit 3. The conveyor mechanism includes conveyor rollers 95 and 96 and pressure rollers 97 and 98, which in combination convey the sheet of film 83 further into the exposure unit.

Due to the continued rotation of the eccentric disk 92, the swivel arms 57 and 58, and thus the hooks 65 and 66, return to the standby position. The separating mechanism is also influenced by rotation of the eccentric disk 85 such that the rollers 15 and 16 are pivoted back to their original position via the system of articulations 6, 7, 9–14. Each gear wheel 19 and 20 is provided with a free-wheeling hub 101. As a result, the gear wheels 19 and 20 turn only in the direction described above. When the rollers 15 and 16 swivel back to their original position, the gear wheels 19 and 20 thus do not turn with them, but are then placed against the surface of the next, uppermost sheet of the film stack.

The described sequence, i.e., the alternating operation of the separating mechanism and the removal mechanism, is repeated until the last sheet of x-ray film has been conveyed from the x-ray film magazine, or until the sequence is interrupted by the operator.

Although modifications and changes may be suggested by those skilled in the art, it is the intention of the inventors to embody within the patent warranted hereon all changes and modifications as reasonably and properly come within the scope of their contribution to the art.

We claim as our invention:

1. In an x-ray film magazine having a housing and a cover in combination forming an interior volume having a substantially C-shaped cross section adapted for accepting a plurality of sheets of x-ray film, the improvement comprising a flexible foil disposed in the interior of the magazine and following said C-shaped cross section, said foil having one end rigidly connected to a base of said housing and an opposite end resiliently connected to said cover such that, when said x-ray film magazine is loaded with x-ray film, said foil at least partially supports a bottommost sheet of x-ray film in a selected position and location.

2. The improvement of claim 1 wherein said end of said foil which is resiliently connected to said cover of said housing is connected to said cover by means for displacing said foil toward said interior of said volume as sheets are removed from said plurality of sheets of x-ray film.

3. The improvement of claim 1 further comprising a wedge-shaped element attached to said cover for guiding sheets of film out of said magazine.

* * * * *